United States Patent [19]
Becker

[11] 3,916,560
[45] Nov. 4, 1975

[54] MINIATURE AIRCRAFT AND LAUNCHER UNIT THEREFOR

[76] Inventor: Joseph T. Becker, 2 S 214 Sheffield, Glen Ellyn, Ill. 60137

[22] Filed: Sept. 6, 1974

[21] Appl. No.: 503,858

Related U.S. Application Data

[63] Continuation-in-part of Ser. No. 438,856, Feb. 1, 1974.

[52] U.S. Cl. .................................. 46/80; 46/81
[51] Int. Cl.$^2$ .................. A63H 27/00; A63H 27/14
[58] Field of Search .................. 46/74 B, 79, 80, 81

[56] References Cited
UNITED STATES PATENTS

| | | | |
|---|---|---|---|
| 3,113,398 | 12/1963 | Merritt | 46/80 |
| 3,369,319 | 2/1968 | Brown | 46/80 |

FOREIGN PATENTS OR APPLICATIONS

| | | | |
|---|---|---|---|
| 161,579 | 3/1955 | Australia | 46/80 |

*Primary Examiner*—Louis G. Mancene
*Assistant Examiner*—Robert F. Cutting
*Attorney, Agent, or Firm*—James T. FitzGibbon

[57] ABSTRACT

A combination flight vehicle and launching apparatus for use as a toy or as a teaching and demonstration aid. The launcher unit includes a base portion and a tower portion, with the tower having an elastic member affixed thereto at one end and a portion of a latch assembly disposed on the other end. The latch portion is adapted to cooperate with part of the flight vehicle to hold it in position prior to launching. The free end of the elastic member or energizer is releasably attached to the nose portion of the vehicle, and the elastic member is placed in tension by pulling the vehicle downwardly against elastic tension and releasably latching the rear end of the vehicle to the launching tower adjacent the base. The vehicle may be released manually or semi-automatically. Flight is initiated by releasing the latch and permitting the aircraft to be launched vertically for a flight wherein, after maximum altitude has been reached, the aircraft begins its return to earth in a rapid, steep descent and thereafter flares out into a more gradual glide for the remainder of the return flight.

Different forms of flight vehicles are described, certain of which have variable sweep arrangements with different means of providing for such sweep and other flight vehicles have a fixed sweep wing with a relatively steeply inclined leading edge. Aircraft in-flight performance can be varied by presetting the wing sweep or by control surface adjustment, or both, before flight. The aircraft preferably includes a soft nose portion and is adapted to be latched prior to release in a manner providing inherent safety features. Control over the return flight trajectory is also accomplished by applying a torque to the launching member such that the launch will also impart movement to the aircraft around the roll axis thereof.

8 Claims, 23 Drawing Figures

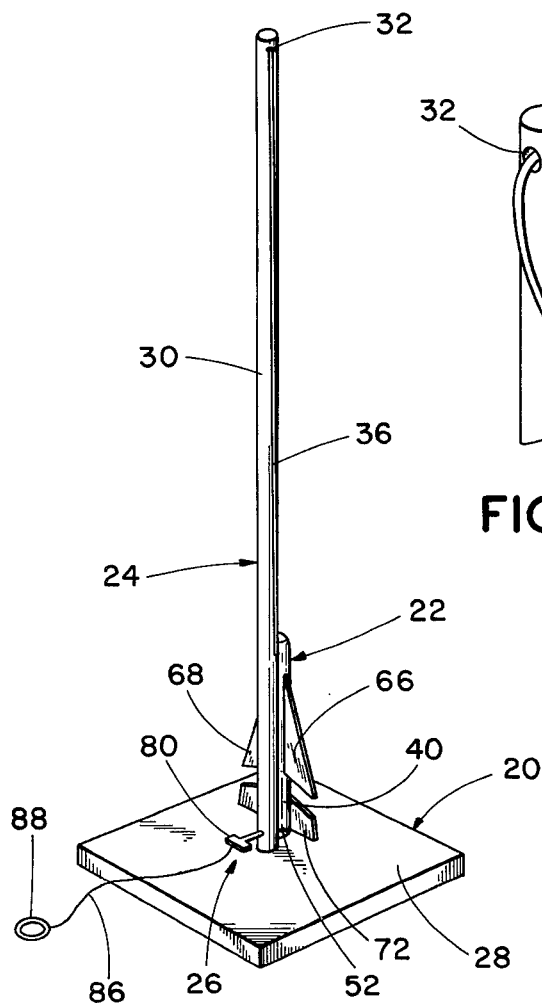
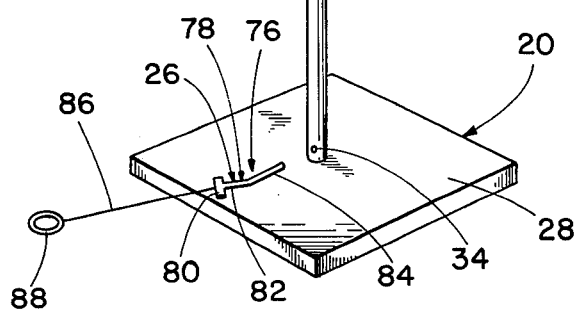
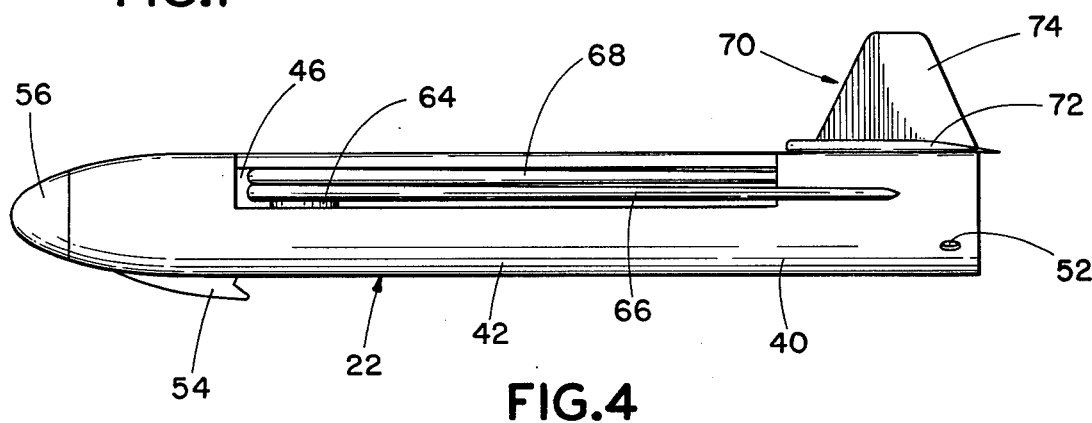

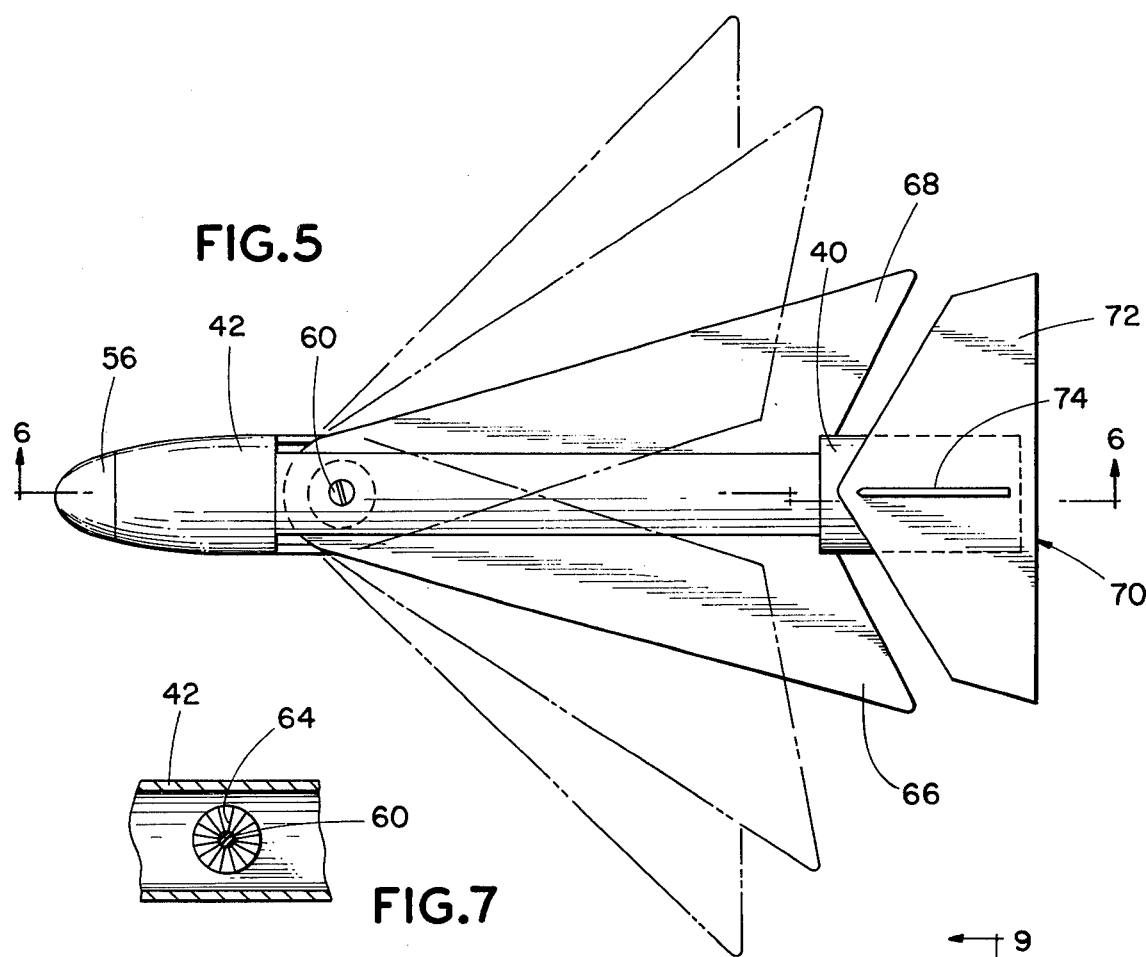

MINIATURE AIRCRAFT AND LAUNCHER UNIT THEREFOR

CROSS-REFERENCE TO RELATED APPLICATIONS

This application is a continuation-in-part of my earlier filed application Ser. No. 438,856, filed Feb. 1, 1974.

BACKGROUND OF THE INVENTION

Soaring or glider aircraft type toys are well-known in the prior art. Such model or miniature aircraft, often simply called "gliders", are generally propelled either directly by hand, or by a hand held launching device, such as a slingshot type launcher. The desire by children to participate in important real-life events is manifested by a desire on the part of such children to use toys which simulate real-life occurrences. One such occurrence which stirs the imagination of many children is the launching of rocket-propelled missiles into space, and the subsequent retrieval of all or part of such missiles from space. To a certain extent, sophisticated actual and simulated rocket toys have catered to the desired on the part of older children. However, most if not all of these devices do not fill an acceptable need for younger children. It is believed that there is still a definite need for a toy which simulates launching a rocket, which toy may be used by a younger child in his own yard, for example, as opposed to the highly sophisticated device which utilizes complicated or dangerous propellants, and which also demonstrates missile "reentry" or return trajectories and/or flight characteristics. By way of example, the flights of the "X-15" piloted rocket glider and those of the proposed "space shuttle" and "Dyna-Soar" aircraft projects may be simulated for amusement and/or educational purposes.

According to the invention, the flight vehicle simulates launching of a rocket from a tower and is launched upward substantially vertically. The flight vehicle reaches the maximum altitude of its flight path and thereafter begins its descent in a rapid, steep drop, thereafter flaring out into a more level attitude and eventually returning to earth in a glide.

The launcher unit has a base which is adapted for mounting on the ground or other generally flat and horizontal surface. A tower is fixed to the base and extends substantially vertically from the base. An energizer, preferably a length of rubber band or other elastic material, is connected to the tower and operates to propel the flight vehicle upward.

One form of flight vehicle construction includes a tubular fuselage having a closed, soft nose and a pair of swept-back wings extending out of the tubular fuselage. A tail assembly is mounted on the rear end of the fuselage, which tail assembly includes a horizontal stabilizer and a vertical tail plane. A launching hook is connected to the bottom surface of the fuselage near the front thereof for releasable connection of the fuselage to the elastic launcher.

A latch assembly releasably locks the flight vehicle to the tower adjacent to the base while the flight vehicle is releasably attached to the energizer, thereby holding the elastic material in an extended position. Release of the lock allows the energizer to propel the flight vehicle upwardly along the tower and away from the base. When the flight vehicle reaches the top of its climb, the flight vehicle ceases to gain altitude and then drops back toward the earth. As its vertical speed increases, it gradually flares out into a glide and returns to earth.

In view of the failure of the prior art to provide a demonstration and amusement device of the character of that provided by the invention, it is an object of this invention to provide a miniature aircraft and launcher wherein the aircraft simulates rocket flight, and which also descends to earth in a flight of moderate speed rather than by parachute or in a free fall.

It is another object of this invention to provide a rocket-like flight vehicle which drops rapidly for a certain distance and then automatically goes into a glide of reduced slope and vertical speed.

It is another object of the present invention to provide a model aircraft and launcher which simulates at least certain of the launching and flight characteristics of the aircraft.

Another object is to provide a model aircraft and launcher combination which is more easily manipulated from a position of safety, thereby decreasing the risk of injury to the user occasioned by inadvertent launching of the vehicle.

A further object is to provide a model flight vehicle having a nose portion which is intentionally made of a soft material to avoid injury to a person accidentally struck by the vehicle as well as to prevent damage to the vehicle itself upon landing or upon striking another object.

Another object is to provide a vehicle and launcher combination which is readily adapted to provide different flight trajectories of the aircraft, depending upon the manner in which the aircraft is arranged before flight and also upon the manner in which the craft is propelled from the launcher.

A still further object is to provide a combination aircraft launching apparatus having means to cause rotation of the aircraft about its roll axis as it is launched substantially vertically from a stationary launching or catapult apparatus.

Still another object is to provide a catapult and an aircraft adapted for releasable association therewith, with the catapult and aircraft being arranged so that the aircraft will be propelled vertically from the stationary catapult upon release of a latch arrangement securing the aircraft to a portion of the catapult.

Another object is to provide an aircraft and launcher assembly utilizing a fixed launcher or catapult and characterized in the force-applying portion of the catapult is releasably attached to the forward portion of the aircraft while the aircraft is temporarily held under tension by means secured to the rear end thereof.

A further object is to provide an aircraft having a simplified system permitting control of flight characteristics about the pitch and roll axes of the aircraft.

Another object is to provide a combination aircraft and launcher or catapult capable of either manual or semiautomatic release of the flight vehicle.

A still further object is to provide an aircraft and launching apparatus adapted to demonstrate aircraft flight characteristics and principles.

The foregoing and other objects and advantages of the invention, including those objects and advantages inherent therein, are accomplished by providing a model aircraft and a launching apparatus therefor with the launcher including a vertical tower having an elastic member affixed thereto and with the aircraft having a launching lock on one end thereof and a launcher engaging means on the other end thereof, with the flight vehicle being capable of being launched substantially vertical to a high altitude, of descending in a steep trajectory during an initial part of its return flight and thereafter continuing its return flight at a more nearly level attitude and at a moderate, and in some cases, variable, rate of descent.

The exact manner in which these objects and advantages are achieved in practice will become more clearly apparent when reference is made to the following detailed description of the preferred embodiments of the invention set forth by way of example, and shown in the accompanying drawings, wherein like reference characters indicate corresponding parts throughout the several views.

BRIEF DESCRIPTION OF THE DRAWINGS

FIG. 1 is a perspective view of a combination apparatus embodying the present invention, showing a flight vehicle in a locked position on a launcher, ready for upward propulsion;

FIG. 2 is a perspective view similar to FIG. 1, but showing the flight vehicle fully released and being propelled upward; and a flight vehicle shown in phantom lines in an attitude wherein the flight vehicle is unlocked from the launcher, but is still connected to an energizer;

FIG. 3 is an enlarged perspective view of a portion of the upper portion of a tower and the energizer connected to the tower;

FIG. 4 is a side elevational view of one form of the flight vehicle shown in FIGS. 1 and 2;

FIG. 5 is a top plan view of the flight vehicle shown in FIG. 4, and showing in phantom lines two additional positions for the wings of the flight vehicle;

FIG. 6 is a cross-sectional side elevational view of the flight vehicle of FIGS. 4 and 5, taken on line 6—6 of FIG. 5;

FIG. 7 is an enlarged fragmentary horizontal sectional view taken on line 7—7 of FIG. 6, showing the top of a wing pedestal supporting the wings of the flight vehicle;

FIG. 8 is a front elevational view of the flight vehicle shown in FIG. 4;

FIG. 9 is a vertical sectional view of the aircraft of FIG. 6, taken on lines 9—9 thereof;

DESCRIPTION OF THE PREFERRED EMBODIMENTS OF THE INVENTION

Figure 10:
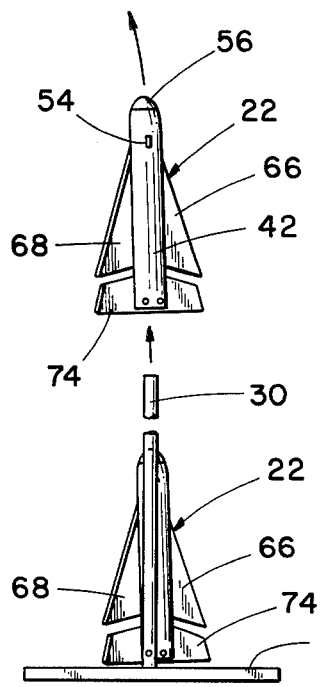
FIG. 10 is an elevational view, with portions broken away, showing the flight vehicle positioned in an attitude for flight to one side and also showing the vehicle leaving the launcher.

Referring now to the drawings, and especially to FIG. 1, a combination miniature aircraft and launcher therefor are shown and are generally indicated by numeral 20. The combination includes a flight vehicle 22, which cooperates with a launcher assembly 24 and is releasably secured to the launcher 24 by a latch unit 26. As will be described in detail hereinafter, upon release of the latch 26, the vehicle 22 is propelled upward by the launcher 24 (as is shown in FIG. 2). When the vehicle reaches maximum altitude on its upward flight, it noses over, then drops rapidly in a steep descent, and thereafter attains sufficient speed to flare out into a glide of relatively gradual slope, and completes its return in this shallow glide.

The launcher assembly 24 includes a generally flat, rectangular base plate 28. A vertical tower 30 projects upwardly from the center of the base 28, with the tower having its major extent or long axis perpendicular to the base. The tower 30 has a band-receiving upper aperture 32 in its upper end, and a latch pin-receiving aperture 34 in its lower end adjacent the base 28. The launcher includes an energizing means in the form of an elastic band 36, which in this instance is a length of rubber extending partially through the upper aperture 32. The band 34 has its ends knotted together at knot 38 to form a continuous member.

One form of the flight vehicle 22 is best shown in FIGS. 4, 5 and 6. This vehicle 22 includes a fuselage 40, having a tubular body 42, and a nose 44 closing off the body 42 at one end thereof. The tubular body 42 also has a wing slot 46 extending therethrough for receiving a pair of wings, as will be described in detail below. Three launching lock apertures 48, 50 and 52 are formed in the tubular body adjacent the end opposite the closed nose 44, that is, at the rear or tail end of the fuselage 40. These apertures 48, 50 and 52 are used in cooperation with the other elements of the launching apparatus, to provide different flight paths, as will be described in detail below, for study or amusement purposes.

The flight vehicle 22 also includes a launching hook 54 formed integrally with the fuselage 40 adjacent to the nose of the fuselage. A soft nose tip 56 is secured to the front of the nose portion 44. The soft nose is preferably made of a foamed plastic or elastomeric material to provide a blunt but soft forward end to the flight vehicle.

A wing support assembly generally designated 58 is mounted within the tubular body 42. The wing support assembly includes a threaded screw 60 extending vertically through the tubular body to provide a wing pivot axle for a pair of wings. A wing pedestal 62 receives the shank portion of the screw 60 and is held in position thereby. The pedestal 62 has a ribbed or textured top 64, which provides an engagement surface of high friction for the wings. Two half-wings 66 and 68 are pivotally mounted on the wing pivot axle and extend through the wing opening 46 in the body 42. Each of the wings is generally flat and is normally adjusted to a position providing a swept-back leading edge (as may be best seen in FIG. 5), for reasons which will become apparent hereinafter. Each wing is formed of a pliable, deformable plastic material so that the tip of each wing may be selectively bent on appropriate amount (as shown in FIG. 8) to provide variable flight characteristics of the flight vehicle.

A tail assembly generally designated 70 is mounted on the rear end or tail portion of the fuselage 40. The tail assembly includes a conventional, generally flat horizontal stabilizer 72 and a conventional generally flat vertical fin or stabilizer 74.

In the constructions shown in FIGS. 4–9 and 13 and 14, the longitudinal apparent center of gravity falls at the midpoint of the aircraft, that is, in a typical position of wing adjustment, an aircraft made as shown and having a length of 10 inches, for example, would balance evenly when supported at a point 5 inches from the nose thereof. Although this feature is not an essential one, it does in certain cases provide a good indication that the vehicle will exhibit the desirable flight characteristics described.

The flight vehicle latch 26 includes a locking pin 76, which has a shank 78. A head 80 is formed integral with one end of the shank. The shank 78 includes a head end portion 82, and a tail end 84, which is bent at a slight angle, such as 10° to the remainder of the shank. A release cord 86 has one end thereof secured to the head 80 and the other end thereof to a pull ring 88.

In the operation of the combination aircraft and launcher 20, the elastic energizer loop 36 is placed into the launching hook 54 of the flight vehicle. The flight vehicle is pulled down toward the base 28. Pin 76 is inserted in the tower latch apertures 34 and into one of the launching lock apertures 50 in the fuselage. At this point, the elastic tubing is stretched under considerable force. When the user pulls the ring 88, the pin 76 is released from the launching lock aperture 50 permitting the elastic tubing to propel the flight vehicle upward along the tower 30. The momentum of the flight vehicle continues to fly upward straight until the air resistance and the force of gravity overcome the kinetic energy of the flight vehicle. The flight vehicle then ceases to gain altitude, and gravity causes the flight vehicle to start to fall back to earth. As the flight vehicle 22 accelerates due to gravity, the vehicle attains a speed sufficiently great to generate enough lift on the wings 66 and 68 to cause the vehicle to flare into a more shallow glide, in which attitude the vehicle then glides back to earth at a safe speed.

It may be seen that the toy simulates the launching of a rocket-propelled missle from a tower; then a fast reentry of the missle or space vehicle into the atmosphere; and then a slow glide back to earth for a soft landing.

The control and flight surfaces of flight vehicle 22 may be adjusted to cause a number of variations in the pattern of its flight. The wings 66 and 68 may be adjusted to the fully swept-back position (as shown in solid form in FIG. 5). With the wings in this configuration, the flight vehicle reaches a maximum height and returns to land at a maximum gliding speed. However, the height of flight may be reduced, and the gliding speed and descent angle may be reduced, by extending the wings outward from the fuselage (as shown in phantom lines in FIG. 5). It may be appreciated that the wings are held relative to each other by the friction between the wings; and that the lower wing frictionally engages the ribbed top 64 of the wing pedestal. Thus, the wings are securely held in a pre-selected attitude.

As was referred to above, the wings 66 and 68 are made of a deformable material so that the wing tips may be bent to change the flight characteristics of the flight vehicle, thereby providing another variation to the flight pattern of the vehicle 22.

Figure 11:
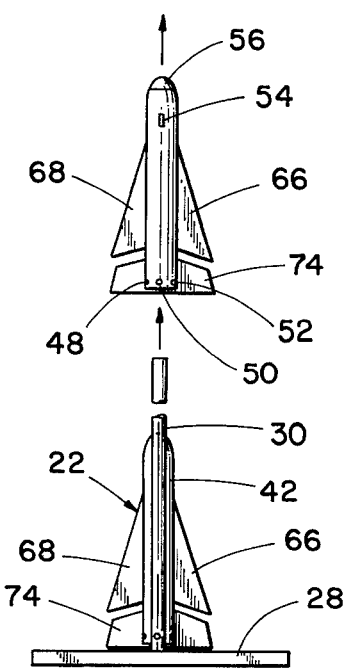
FIG. 11 is an elevational view similar to FIG. 10, but showing the flight vehicle positioned for straight upward flight and also showing the vehicle leaving the launcher.
Figure 12:
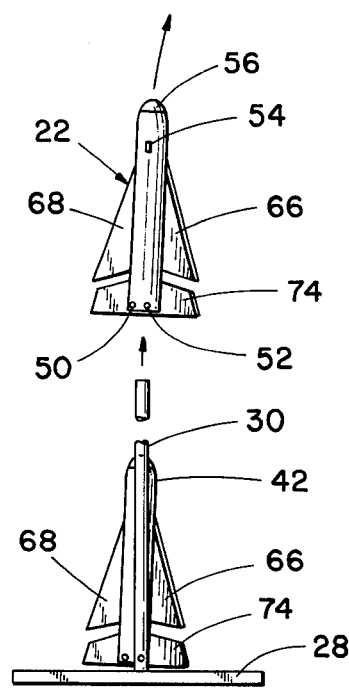
FIG. 12 is an elevational view similar to FIG. 10, but showing the flight vehicle in an attitude for flight in the opposite direction to that shown in FIG. 10 and also showing the vehicle leaving the launcher.

The engagement of the release pin 76 with one of the launching lock apertures also causes a variation in the flight of the vehicle 22. The launching disclosed above assumed that the lock pin 76 was positioned in the central lock pin aperture 50, so that the launching path is similar to that shown in FIG. 11. When it is desired to have the flight vehicle fly off in a direction other than vertical, the pin 76 is positioned in the lock pin aperture 48 so that the flight vehicle is cocked slightly (as shown in FIG. 10); and the flight vehicle consequently tends to fly in a predetermined direction. On the other hand, when it is desired to launch the flight vehicle in an opposite direction, the pin 76 is positioned in launching lock aperture 52 so that the vehicle is cocked in the opposite direction (as shown in FIG. 12). Upon release, the aircraft tends to fly in such opposite direction.

A further advantage may be achieved with the present combination vehicle and launcher by use of the particular launching pin construction described above. As was mentioned above, the tail end 84 is inclined at 10° to the portion of the head end 82. This feature may be used to provide a surprise element residing in an intermediate moment of launching. This is accomplished by positioning the pin 76 in an attitude wherein the tail end 84 extends toward the free end of the tower, so that the force of the energizer on the flight vehicle causes the flight vehicle to creep slowly up along the tail end until the flight vehicle eventually disengages from the lock pin. The energizer then propels the flight vehicle upward along the tower. It may be appreciated that this element of surprise, namely, not knowing the exact moment of launching, may be utilized in various games by children.

When the pin 76 is positioned in an attitude wherein the tail end 84 extends toward the base, the launch vehicle is securely locked and is not launched until the pin is positively removed from the launching lock aperture by a positive pull.

Figure 13:
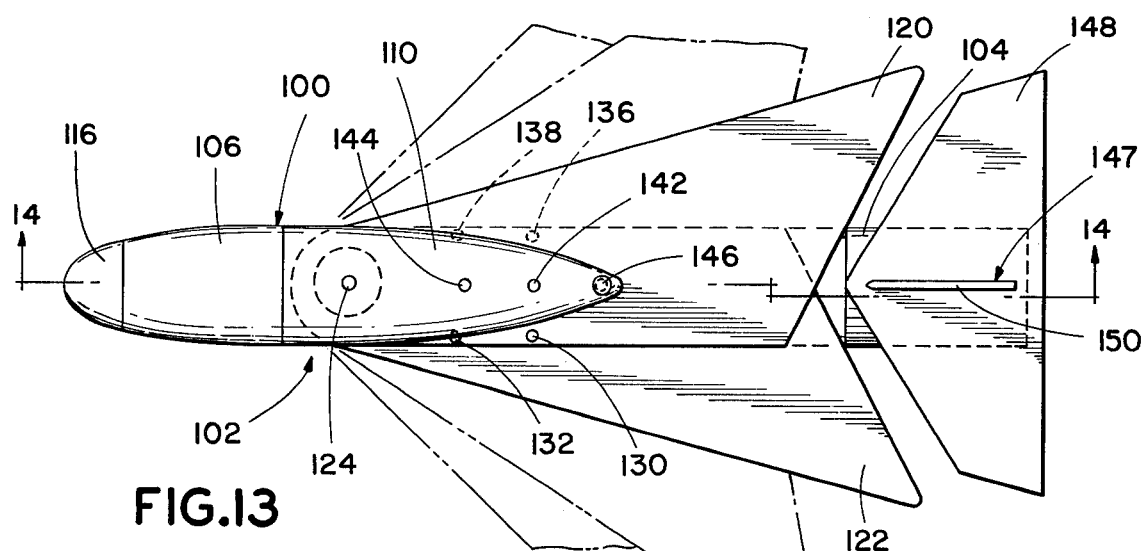
FIG. 13 is a plan view of a modified form of the flight vehicle, utilizing a pin to lock the wings in a selected attitude and showing in phantom lines two additional positions of the variable-sweep wings.
Figure 14:
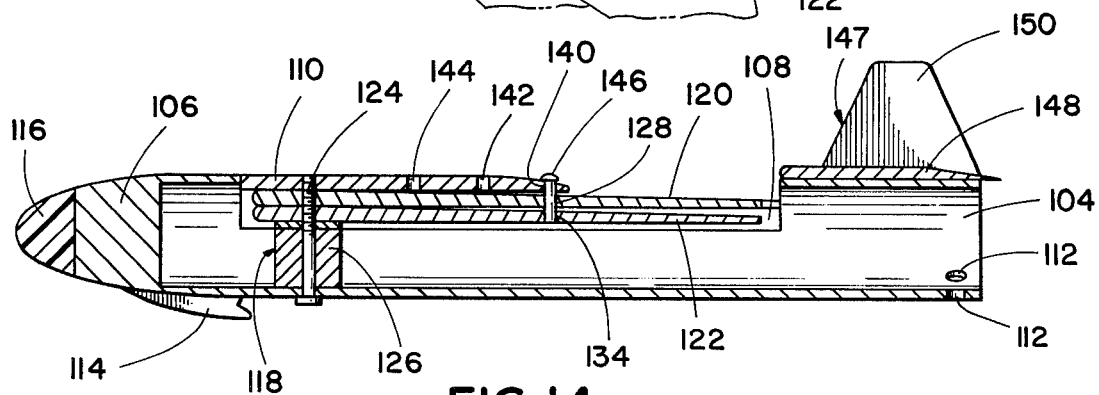
FIG. 14 is a vertical sectional view of the vehicle of FIG. 13, taken on lines 14—14 thereof.

A modified form of the flight vehicle 22 is shown in FIGS. 13 and 14, wherein the vehicle is generally identified by numeral 100.

The flight vehicle 100 includes a fuselage 102, having a tubular body 104, with a closed nose 106 at one end thereof. The tubular body includes a wing opening 108 on the top side thereof. A wing lock extension 110 is integrally formed with the tubular body and extnds into the wing opening 108. Three launching lock apertures 112 are also formed in the tubular body adjacent to the rear end of the vehicle 100 (opposite the closed nose 106); only two such apertures 112 are shown in FIG. 14. These apertures are identically spaced with respect to their counterpart apertures 48, 50 and 52 of flight vehicle 22.

The flight vehicle 100 includes a launching hook 114. The launching hook is formed integral with fuselage 102 adjacent to the nose of the fuselage. A soft tip 116, similar in construction to the soft nose 56, is likewise fixed to the closed nose 106.

A wing support assembly 118 is mounted within the tubular body and provides a wing pivot axle for a pair of wings 120 and 122. The wing support assembly 118 includes a threaded screw 124, which extends vertically into the tubular body and is fixed into the wing lock extension 110. A wing pedestal 126 receives a portion of the screw 124 and is held in position thereby. The wings 120 and 122 are pivotally mounted on the screw 124, which is the wing pivot axle. The wings are of similar or identical construction to the wings 66 and 68 of flight vehicle 22, except that wings 120 and 122 have locking apertures contained therein for selectively locking the wings in predetermined positions. Wing 120 has locking apertures 128, 130 and 132 contained therein, while wing 122 has locking apertures 134, 136 and 138 contained therein. The wing lock extension 110 contains aligned lock apertures 140, 142 and 144. A lock pin 146 is shown tightly but removably inserted in the aperture 140 of the wing lock extension 110. The pin 146 extends through apertures 128 and 134 of wings 120 and 122, respectively, to hold the wings in a swept-back position.

FIG. 13 shows how the wings 120 and 122 may be locked into any of three selected positions by appropriately positioning the wings and placing the lock pin 146 into an appropriate locking hole. As was described above, the wings 120 and 122 are shown in FIG. 13 to be locked in their furthest swept-back position. When the wings are to be extended further, the lock pin 146 is removed. The wings are positioned so that apertures 130 and 136 of wings 120 and 122, respectively, are aligned with aperture 142; and the lock pin is then inserted, locking the wings in a position of moderate sweep (as shown in phantom lines in FIG. 13). The wings are positioned in the furthermost extended or least swept-back configuration simply by aligning the apertures 132 and 138 of wings 120 and 122, respectively, with aperture 144 and locking the wings in that position when desired.

The flight vehicle 100 also includes a tail assembly 147, mounted on the tail portion of the fuselage. The tail assembly 147 includes a horizontal stabilizer 148 and a vertical stabilizer 150.

The arrangement of the various elements of the flight vehicle 100 is preferably such that the apparent longitudinal center of gravity is at the front-to-rear center of the vehicle, as described in connection with the embodiment of FIGS. 4–6, for example. This arrangement provides for improved flight characteristics of the flight vehicle 100.

As was described above, the position of the wings 120 and 122 of the flight vehicle may be adjusted and locked into three selected positions. The flight vehicle 100 is used in the same manner as vehicle 22, with launcher 24 and lock 26.

Figure 15:
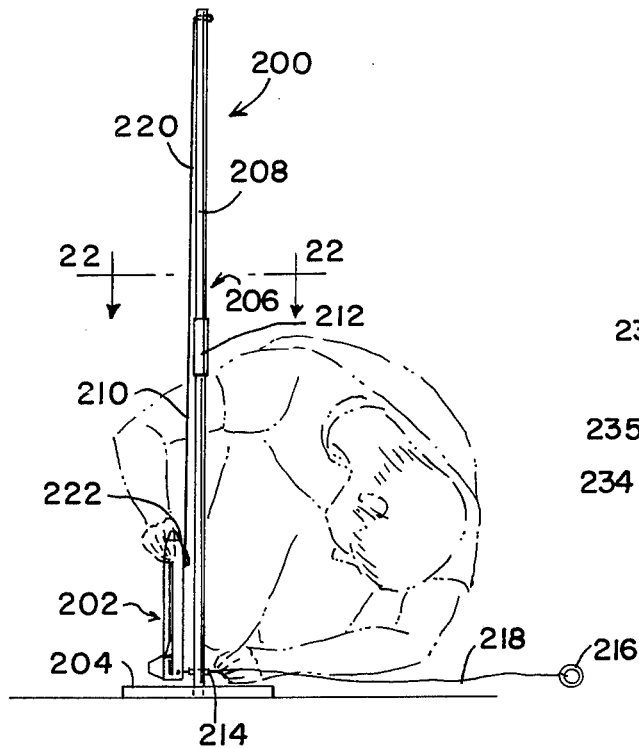
FIG. 15 is a side elevational view of another form of aircraft and launcher of the invention, showing certain safety features residing in the manner of preparing the aircraft for launching.

Referring now to the embodiment of the invention shown in FIGS. 15–23, there is shown in FIG. 15 an aircraft launcher assembly generally designated 200 and an aircraft generally designated 202. The launching assembly 200 is shown to comprise a thick base portion 204 having a segmented tower generally designated 206 extending uprightly therefrom, with the upper tower portion 208 being fixed to the lower portion 210 by a sleeve type connector 212. Latching means in the form of a latching pin 214 is shown to extend through a lower portion of the upright 210 and to be secured to a pull ring 216 by a flexible line 218. An extensible elastic launching propulsion member 220 is affixed to the upper end of the tower portion 208 at one end thereof while the lower end 222 of the elastic unit 220 is releasably engaged by a suitable projection 224 (FIG. 17) on the forward portion 226 of the aircraft 202 (FIG. 7).

While the launching assembly 200 is substantially similar to that of the assembly 20 shown in FIG. 1–3, the form of aircraft 202 is different from those shown in FIGS. 1–14, in a number of respects, including the fact that its wing is of a fixed sweep, delta or deltoid configuration.

Figure 16:
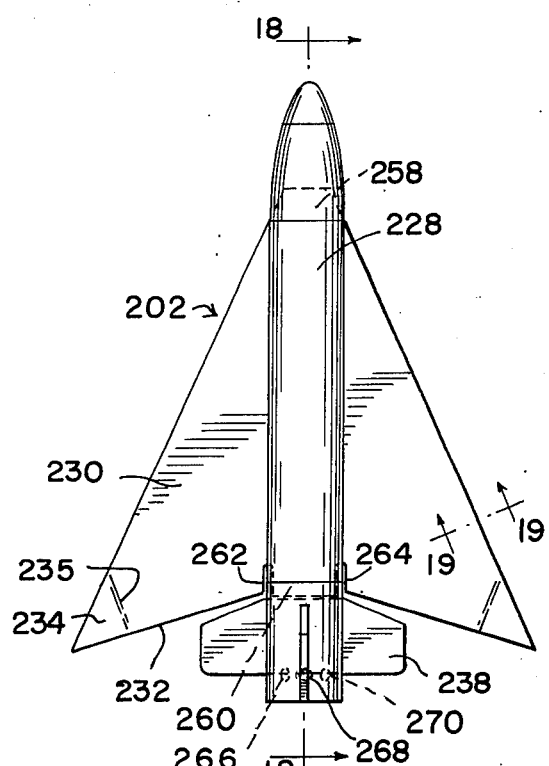
FIG. 16 is a top plan view of another form of aircraft made according to the invention.
Figure 17:
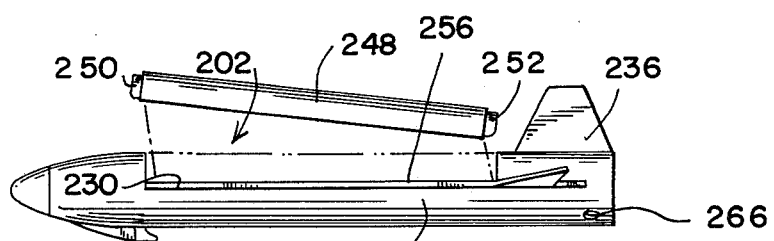
FIG. 17 is a side elevational view of the form of aircraft shown in FIG. 16.
Figure 18:
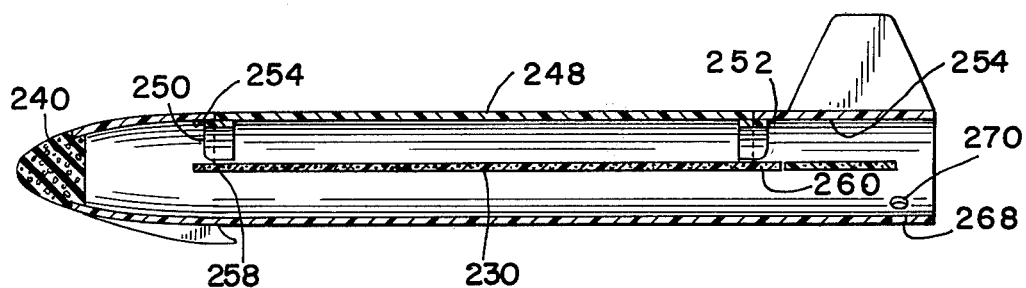
FIG. 18 is an enlarged vertical sectional view of the form of aircraft shown in FIGS. 16 and 17, showing the nose, the wing, the tail surfaces, and part of the fuselage in section.

Referring now in particular to FIGS. 16–18, a form of aircraft is there shown to include a fuselage 228, a delta or modified delta wing 230, having a slightly reversely swept trailing edge 232 and tip control surfaces or "elevons" 234 joined to the wings along a line of inflection 235. The aircraft 202 includes a vertical tailplane 236 and a horizontal stabilizer 238. The nose portion 240 is shown to be of a rounded configuration and is preferably constructed of a stiff but somewhat resilient material such as a medium density, open cell urethane elastomer.

Figure 19:
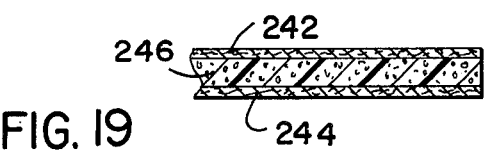
FIG. 19 is a fragmentary sectional view, on a further enlarged scale, showing one form of wing construction.

FIG. 19 shows that the material comprising the wing may be a sandwich type material having upper and lower surfaces 242, 244 of a thick paper or plastic material with the core 246 comprising a fairly low density, closed cell foam material, such as expanded polystyrene beads fused into a single structure ("styrofoam"). The launch hook 224 is fixedly attached to and may be integrally formed with the forward portion 226 of the fuselage 228. The fuselage proper is preferably made in hollow, cylindrical tube form from a thermoplastic material, closed off at one end by the nose 240.

A combination fuselage cover and wing lock unit 248 is shown to be provided and to include, respectively, forward and rear edge flanges 250, 252 which are of reduced diameter and sized for snug reception within the inner surfaces 254 of the fuselage 228. The cover unit 248 is relatively flexible and, by reason of the short axial extent of the flanges 250, 252, the cover 248 may be press fit into the position shown in FIGS. 17 and 18 by pressing inwardly and downwardly on the rear portion thereof to snap this portion within the fuselage, following which the nose or front edge flange 250 may be snapped into the position of use shown. In this manner, the lower edges 256 of the cover 248 closely overlie and clampingly locate the wing 230.

FIG. 16 shows that the wing 230 is of single piece construction having a leading edge tab 258 and a trailing edge tab 260 sized for reception within the fuselage, and that slots 262, 264 are provided so that the wing may be fitted into its desired position of use in the fuselage. This is carried out by inserting the wing 230, trailing edge first, into the fuselage and sliding the wing to the rear to the maximum extent permitted by the slots 262, 264. Next, the wing is moved forwardly until the leading edge of the tab 258 assumes the position shown in FIG. 16. Thereupon, the fuselage cover 248 is manipulated as referred to above, the wing 230 is clamped into place by the force of the stiff but resilient cover 248.

FIGS. 16–18 also show that left, center, and right latching pin apertures 266, 268 and 270 are provided in the rearward portion of the fuselage and are adapted to receive therein the shank of the latching pin 214.

Figures 20, 21:
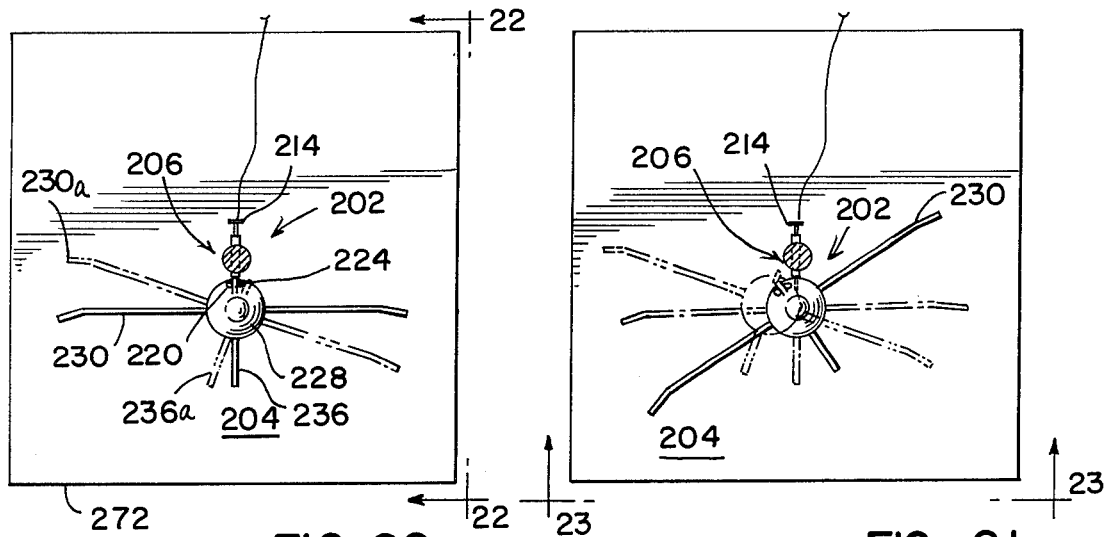
FIG. 20 is a plan view of the launcher of the invention, showing the aircraft in one position thereof before launching.
FIG. 21 is a plan view of the aircraft and launcher of the invention, showing the aircraft in a different prelaunch position and showing the manner in which the aircraft is made to roll in response to its condition of loading.

Referring now to FIG. 20, the aircraft generally designated 202 is shown to be in pre-launching position, with the underside of the fuselage lying closely adjacent the rod 206, and with the latching pin 214 inserted within the center opening 268. The elastic band 220 is engaged with the hook 224. In the position shown, the wing 230 lies parallel to one edge portion 272 of the base plate 204. The fuselage 228 is disposed in a substantially vertical alignment.

FIG. 20 also shows in phantom lines that, in an alternate launching position provided by engaging the latch-pin 214 with aperture 270, for example, the wings 230a and the tailplane 236a will be initially offset from the positions of their counterparts 230, 236, that is, the aircraft will be shown to have been rotated somewhat about its longitudinal or roll axis.

Referring now to FIG. 21, the consequence of the alternate launching position of FIG. 21 is shown. In this view, it will be seen that the aircraft 202 is positioned with respect to the launching tower 206 in the manner shown, that is, with the latching pin 214 engaged in the right-hand opening 270, and with the aircraft as a whole rolled counterclockwise from the position thereof shown in solid lines in FIG. 20. The phantom lines in FIG. 21 show two of the successive positions the aircraft will occupy upon release from the launching device, in the manner and for the reasons referred to below.

Figures 22, 23:
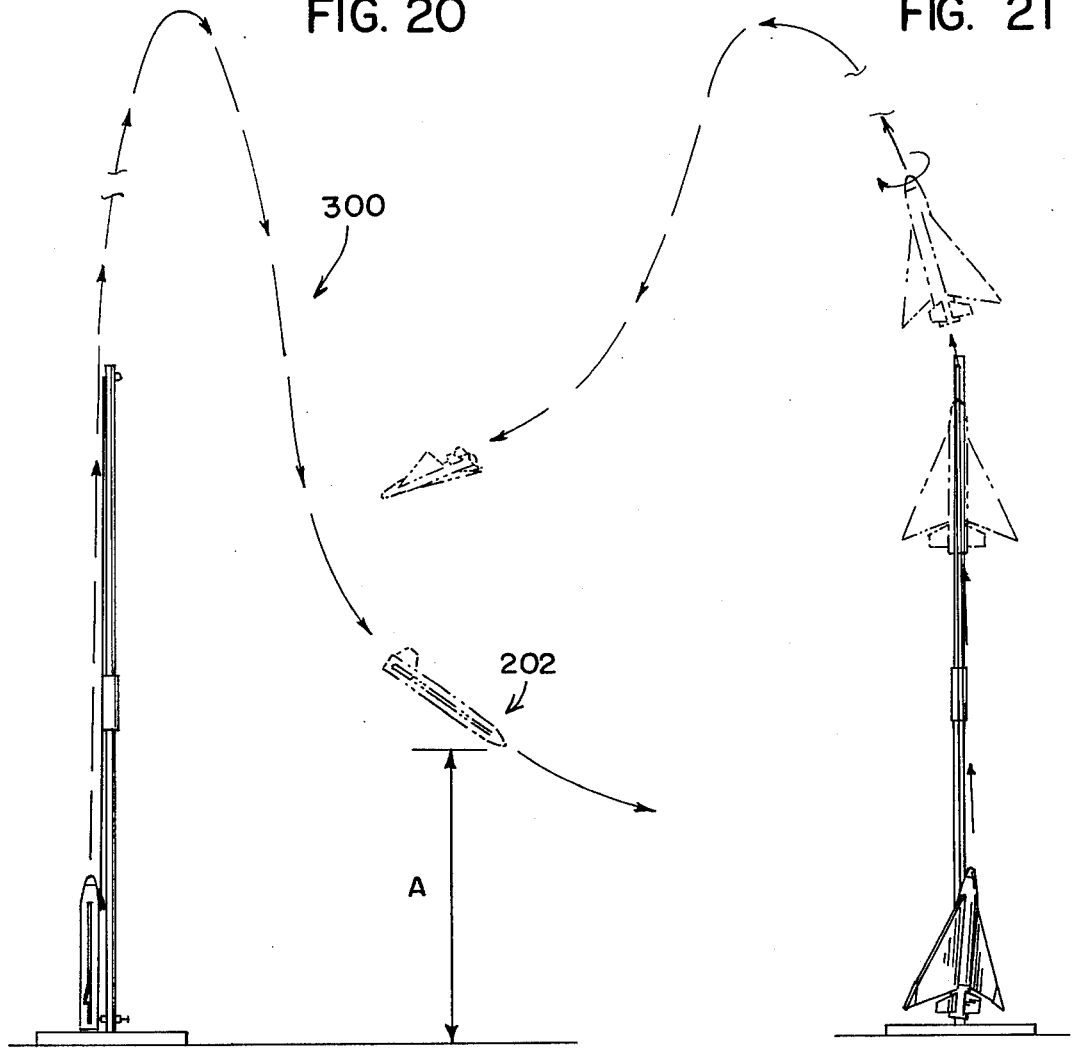
FIG. 22 is a side elevational view, on a reduced scale, of the apparatus of FIG. 20 and showing the flight trajectory of an aircraft projected from the catapult from one launching position thereof.
FIG. 23 is a side elevational view, on a reduced scale, of the apparatus of FIG. 21 and showing the flight trajectory of an aircraft projected from the catapult from another launching position thereof.

Referring now in particular to FIG. 22, this drawing schematically shows the trajectory 300 typically undergone by the aircraft 202 after launching thereof. In the embodiment shown in FIG. 22, the aircraft is positioned with the launching pin 214 received in the center opening 268, thus positioning the aircraft in a vertical attitude with its wings level. Upon launching, the aircraft is rapidly propelled to its maximum altitude, which may be from 50 to 200 feet, whereupon further gain in the altitude ceases and the aircraft stalls, pitches into a steep, nosedown attitude, in which it drops for a number of feet until it attains additional air speed. Thereupon, the aircraft 202 flares out and proceeds downwardly in a gradual glide, the altitude and air speed of which are partially determined by the pre-positioning of the control surfaces 234 on the wings 230.

As is well known, adjustment of the control surfaces 34 will also result in different flight characteristics of the aircraft. Typically, however, as shown in FIG. 22, an aircraft of the invention, launched to a height of 50 to 200 feet, subsequently will drop relatively vertically to an altitude of some 10 to 20 feet lower than its maximum achieved height before attaining a desired attitude, namely, one which will result in a glide ratio of from about 2:1 to perhaps 10:1 or more.

FIG. 23 illustrates the manner in which aircraft flight is achieved and controlled in response to another initial position of the aircraft. In the embodiment of FIG. 23, the aircraft is shown to be positioned with the wings rotated about the roll axis as shown. Inasmuch as the elastic member 220 is not only extended in this position of the aircraft, but is also slightly twisted, and because the aircraft is consequently in a slightly tilted initial launch position, when the latch pin 214 is released, the aircraft proceeds generally straight up, but also tends to rotate about its roll axis in response to the torque or twisting moment in the elastic member.

In other words, as the rubber band contracts, it also tends to unwind, and this produces a rolling moment in the aircraft, although initially pointed to the right, upon release, tends to move its nose somewhat to the left, as well as tending to roll about its own axis. Accordingly, it will react as shown in successive phantom line position, first straightening itself and then rolling to the left. The rolling motion also induces a left turn component, and when the aircraft will therefore fly in the trajectory shown, finally rolling out to a horizontal position and returning to earth in a glide of moderate slope after an initial drop wherein sufficient air speed is attained to maintain flight. Obviously, positioning the aircraft initially in an opposite position will induce an opposite hand rotation in flight.

The variable sweep wing configuration of the form of aircraft shown in FIGS. 1–14 provides a method of creating a flight vehicle with differing height attainment potentials and different glide rates; while the form of aircraft shown in FIGS. 15–23 has also proven effective to simulate space craft launching and return flights, and also provides flight characteristics which insure safe return of the craft and which demonstrate flight principles.

Referring now to several very important aspects of the present invention, FIG. 15 shows that, in a typical embodiment, the launching post is preferably at least about 2½ to 3 feet high, and perhaps longer, with the aircraft length being approximately 9 inches. This height of the launching tower, in combination with the small diameter of the latching pin 214, the small size of the fuselage opening 270, and the fact that the launching hook 224 is adjacent the nose, provide important safety features and other desirable characteristics. For example, by reason of the rearward location of the opening 270, the user ordinarily lowers his head to the position shown in FIG. 15 to facilitate alignment of the pin 214 with the opening 270. At this time, one of his hands holds the nose of the craft as shown, thus tensioning the elastic band 220. In this way, should the aircraft be inadvertently released, it will not strike the user in a vulnerable area. By reason of locating the hold-down aperture 270 in the rear of the craft, and positioning the launching hook 224 in the front, tensile forces in the rubber band also tend to align the vehicle 202 for launching along the intended vertical path.

Furthermore, the provision of the soft nose 240 creates an additional safety factor, which is desirable in the event a user is inadvertently struck with the toy aircraft. The nose also protects the structural integrity of the vehicle in the event of a hard landing.

Another desirable feature of the invention is that the aircraft is launched along a line parallel to the axis of the launching tower. Thus, unlike slingshot-type launching arrangements, there is no danger that the aircraft will undesirably strike a portion of a launching structure by reason of being launched on a collision course with the end of the tower. Because of the relatively great height of the launching tower, preflight alignment is assured, and a relatively strong elastic member may be used to provide the strong acceleration necessary to launch the vehicle to a great altitude.

The simplified control system cooperates with the multiple position pre-launch orientation to provide the user a variety of flight paths, and thereby gives the user an opportunity to study the influences of wind and weather on aircraft and on flights thereof. The normal flight path of the aircraft also demonstrates the flight principle of aircraft stall, stall recovery, and glide performance. The user may observe a great variety of flight paths, and will gain experience in guiding the vehicle, as well as valuable experience in seeing its reaction to weather and wind conditions.

Because of the simplicity of the apparatus, and the fact that the launching components are entirely exterior to the aircraft, cost is minimized. Accordingly, in the event the aircraft is lost, other essential components need not be lost therewith, and the aircraft may be inexpensively replaced.

Referring now to another feature of the invention which may be varied to suit conditions, the angle of inclination between the shank of the locking pin 76 nearest the head thereof and the shank portion nearest the other end thereof, an angle of about 10° to about 15° has been found satisfactory, with other angles lying between about 3° and 15° or more being operative. These angles are measured as the included angle between the inclined portion of the shank and a projection of the straight portion thereof. FIG. 22 schematically shows an altitude "A" at which the flight vehicle 202 is beginning to flare out into a normal, shallow glide. Typically, this distance or altitude is from 10 to 30 feet from the highest altitude reached by the aircraft; under ideal conditions the vehicle may reach 200 feet of altitude, flaring out at 180 feet, for example. Under other conditions, the vehicle might attain only some 40 to 50 feet, gliding gradually to earth the last 20 or 30 feet thereof, by way of example.

It will thus be seen that the present invention provides a novel combination flight vehicle and launcher therefor, having a number of advantages and characteristics, including those inherent in the invention and others to which specific reference is made herein. It is anticipated that, a few specific embodiments having been shown by way of example, various other variations and modifications will occur to those skilled in the art, and it is contemplated that such changes may be made without departing from the spirit of the invention or the scope of the appended claims.

I claim:

1. A combination flight vehicle and launching apparatus comprising, in combination, a flight vehicle having a vehicle body with front and rear end portions, and including wings extending laterally outwardly from said vehicle body, means disposed adjacent said front portion of said flight vehicle and presenting a rearwardly directed surface for engaging the free end of an elastic propulsion device, a launcher assembly having a base portion and a tower element extending vertically a substantial distance from said base portion, means releasably attaching said rear end portion of said flight vehicle body to said launching apparatus in the vicinity of said base portion thereof, an extensible elastic propulsion member having a fixed end attached to a part of said tower element at a point which is spaced a substantial distance above said launcher base and having a free end releasably engaging said rearwardly directed propulsion-engaging means on said front portion of said flight vehicle, said propulsion member having a length so as to be tensioned substantially when extended and the free end thereof is engaged with said propulsion engaging means of said vehicle and said rear end portion of said vehicle body is attached to said launching apparatus in the vicinity of said base portion thereby enabling the operator to position said vehicle for engagement therewith of said means for attaching said rear end portion of said vehicle to said launching apparatus by pressing downward on the vehicle with sufficient force to tension said propulsion member while engaging said vehicle attaching means from the opposite side of said tower element, and said means for releasably attaching said vehicle rear end portion being at least partially under the control of the operator, whereby, the operator may safely release said vehicle and said vehicle will be propelled upwardly along said tower element by said elastic member and guided into an upward flight path.

2. A combination as defined in claim 1 wherein said means for releasably attaching said rear end portion of said flight vehicle body to said launching apparatus includes at least one opening in the rear end portion of said vehicle body which opening extends into said body transversely thereof, a like opening in a portion of said tower element which is adjacent said base portion, and said means for releasably attaching said rear end portion of said flight vehicle body being in the form of a pin which is sized for snug but releasable reception in both of said openings when said vehicle body is positioned for launching along the side of said tower element and adjacent said tower element base portion with said openings in a position of registration with each other.

3. A combination as defined in claim 1 wherein said flight vehicle wings are in the form of a pair of variable-sweep wings mounted on a common pivot means which is located in a vertical plane extending along the longitudinal axis of the vehicle body, and wherein each of said wings and a portion of said vehicle body includes at least one pair of matching openings therein which are spaced from said pivot means, a pin sized for snug reception in said openings when said openings are in a position of registration with one another, whereby the sweep geometry of said wings may be fixed by aligning said openings and inserting said pin therethrough.

4. An apparatus as defined in claim 1 wherein said wings are of a variable sweep type, said wings being mounted for pivotal movement about a single axis which is in the plane of the longitudinal axis of said vehicle body and means is provided to cause frictional engagement between said wings and a portion of said body thereby enabling said wings to be held in a predetermined position for the duration of at least one vehicle flight.

5. A combination as defined in claim 1 wherein said flight vehicle includes a nose portion thereof made from a firm but resilient cellular material.

6. A combination as defined in claim 2 wherein said pin includes a straight shank portion and an end shank portion, said said end shank portion being inclined from about 3° to about 15° with respect to the remainder of said shank portion and with said inclined portion being adapted for reception into said opening in said flight vehicle, whereby said pin may be withdrawn from said openings and said flight vehicle will be released from said pin at an indeterminate time.

7. A combination as defined in claim 2 whereby said means releasably attaching said rear end portion of said flight vehicle to said launching apparatus includes a plurality of said openings in said vehicle, said openings being disposed at different points on the circumference of said vehicle body portion, thereby, said vehicle may be tilted about its roll axis when positioned for launching, and whereby, upon launching, said vehicle will undergo a rolling motion about its longitudinal axis, resulting in a curvillinear flight path of said vehicle.

8. A combination as defined in claim 1 wherein said vehicle wings are constructed and arranged so as to permit the flight vehicle to be launched readily to a given altitude in a substantially vertical attitude, and so as to cause said vehicle, in its return flight, to nose down initially and lose altitude rapidly, and thereafter, to flare out into a more shallow glide for the remainder of its return flight.

* * * * *